Dec. 28, 1937.    A. E. DRISSNER    2,103,350
DRAWBAR MECHANISM FOR ELECTRIC CHUCKING MACHINES
Filed Oct. 9, 1936
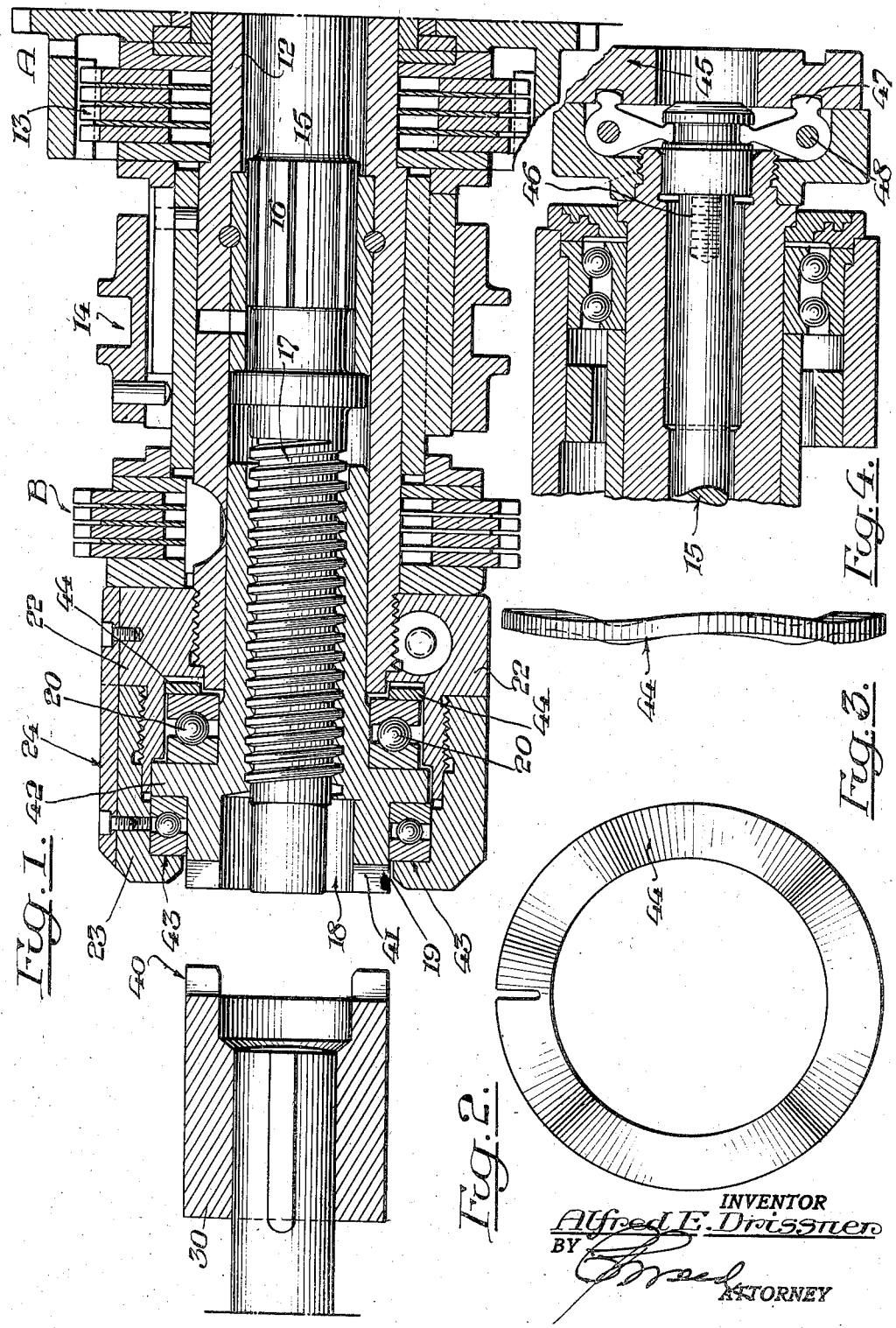
INVENTOR
Alfred E. Drissner
BY
ATTORNEY Patented Dec. 28, 1937

2,103,350

UNITED STATES PATENT OFFICE 2,103,350

DRAWBAR MECHANISM FOR ELECTRIC CHUCKING MACHINES

Alfred E. Drissner, Cleveland, Ohio, assignor to The National Acme Company, Cleveland, Ohio, a corporation of Ohio Application October 9, 1936, Serial No. 104,771

28 Claims. (Cl. 29—38)

This invention relates to electrical chucking mechanisms for automatic multiple spindle machines of that type known as automatic chucking machines having a sliding tool carrier and an indexible work spindle carrier provided with a plurality of rotatable work spindles having chucks for the reception of rough forgings or castings to be operated upon by the tools carried by the tool slide, the object of the invention being to provide an improved cushioning or follow-up means for effecting a more efficient locking of the chucks on the work piece.

A further object of the invention is the provision in an electrically operated chucking mechanism of a follow-up cushioning means located between a bearing thereof and the work spindle, and which is simple in construction and efficient in operation.

The present invention is an improvement upon and is intended for use in connection with electrical chucking mechanisms such as shown and described in the contemporaneously pending applications of C. W. Simpson, Serial Numbers 50,538 and 101,051, filed November 19th, 1935, and September 16th, 1936, respectively, and assigned to The National Acme Company, of Cleveland, Ohio, the assignee of the present improvement and may be used with other chucking machines of the same general character. Therefore, it is deemed necessary to illustrate herein only so much of these applications as is essential to disclose the present improvement.

In these electrical chucking machines, it is desirable, for different classes of work, to provide a cushion for high pressure between the draw rod controlling the chucks and adapters and the rotating sleeve or nut controlling the draw rod. In other words, when the electrical motor operates the rotating sleeve or nut of the draw rod, pressure is built up against the ball thrust bearing of the sleeve and the adapter fastened to the end of the rotary spindle and when this sleeve or nut has tightened, there is a fixed pressure between the draw rod and the sleeve or thrust bearing.

If the forging or casting to be chucked should have thin walls and the diamond of the serration of the chuck jaws penetrate the material, they being held in a fixed position and with positive pressure controlled by the draw rod, there are times when these diamond serrations will dig deeper into the material during the machining operations on the work held by the chucks, and in these machining operations, especially on forgings and castings which are not uniform, the tool will take a heavier cut on one side than on another or perhaps have a jumping action due to the uneven surface, thus permitting the diamond serrations to dig deeper into the material, thereby loosening the pressure between the jaw and the piece chucked so that it is found desirable to have a follow-up pressure. For this purpose, I have provided a spring designed for the pressure required on different classes of work.

In electrical chucking machines, the pressure is a fixed unit and where the chucks, during the cutting operation tend to loosen, there is nothing to follow up the pressure on the chucks and it is, therefore, one of the primary objects of the present improvement to provide a simple, efficient and inexpensive means to follow up the chucks and maintain a constant pressure.

In the drawing accompanying and forming a part of this specification, Fig. 1 is a longitudinal sectional view of the left hand end of one of the chuck spindles illustrating the means for controlling the operation of the draw bar with this improved spring or cushion means in position.

Fig. 2 is a face view of one form of cushioning means.

Fig. 3 is an edge view thereof, and

Fig. 4 is a longitudinal sectional view of the right hand of one of the chuck spindles illustrating the manner of operating the chuck by the draw bar.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawing since the invention is capable of other embodiments, and that the phraseology employed is for the purpose of description and not of limitation.

Reference is made to the applications hereinbefore referred to for a description of the electrical operating mechanism, it being sufficient to say in the present instance that the sliding shaft 30 provided with lugs or projections 40, is automatically shifted back and forth to engage and rotate the draw bar operating sleeve 19 having similar lugs 41 and, in the earlier application, this shaft is electrically rotated, while, in the later application it is electrically reciprocated and rotated to perform its proper operations.

The indexible spindle carrier is provided with a plurality of rotatable chuck carrying spindles 12, only one of which is illustrated. Each of the rotatable spindles 12 has on its rear end a clutch 13 (see Fig. 1) of the common twin disk type for driving and stopping the spindle, this clutch being operated automatically by a sliding spool 14 at the proper time and shiftable by a yoke from suitable mechanism. The disk clutch A controls the rotation of the spindle and the disk clutch B acts as a brake to hold the spindle in a fixed position.

On the inside of the spindle is a draw rod 15 suitably connected at its forward end with the chuck jaws 45 to open and close the same and it may be connected with a two, three or four jaw chuck, an adaptor, or any suitable means necessary to hold the different types of work such as castings or forgings during the turning and boring operations. For this purpose, the forward end of the draw bar (see Fig. 4) has a threaded portion 46 for engaging a threaded member connected to levers 47 for shifting the chuck jaws as hereinafter described.

This draw rod or bar is keyed or splined within the spindle to prevent its turning, as at 16, and is also provided with a thread 17 and has at its end an annular recess 18 for the reception of a guide collar.

Between the draw rod and spindle is located a bronze flanged or shouldered nut or sleeve 19 having the lugs 41 on the end thereof and which turns freely inside the spindle 12. This nut or sleeve is provided with ball thrust bearings 20 and 43 to take up the thrust, the nut 19 turning freely when driven by the sliding shaft 30 connected with an electric motor (not shown).

Screwed on the end of the spindle and fastened thereto is a shouldered nut 22 controlling the adjustment and alignment of the clutches 13. This nut 22, together with the shouldered nut 23 threaded on the nut 22 and securely held thereto by a key 24, holds the rotating nut or sleeve 19 endwise within the spindle with sufficient clearance for the nut to turn freely and permit the insertion of the cushioning means 44 in the form of an annular spring having high and low spots. In other words, the spring is formed with spaced projections or bulges.

Suitable means, of course, is provided for rotating the chuck spindles 12 and is illustrated in the applications referred to. The rotation of the nut or sleeve 19 is obtained by means of the rotating and sliding shaft 30 hereinbefore referred to which shaft is rotated and shifted in the manner set forth in said applications.

Thus, when the cushioning spring is inserted between the nut 22 and the thrust bearing 20, as shown in Fig. 1, it will be seen that when the nut 19 is rotated, the draw bar 15 will be shifted toward the rear of the machine or to the left, as shown in the drawing, by the operation of the threaded portion of the nut 19 upon the thread 17 of the draw bar 15. As the draw bar 15 moves to the left, the pressure on the nut 19, being the reverse or in the opposite direction, the cushion spring 44 is compressed in a load normally approximately 5,000 pounds tending to flatten out the high spots of the spring whereupon a slight space is formed adjacent to the bearing 43. The spring 44 thus becomes effective upon the withdrawal of the shaft 30 with its lugs 40 to urge the draw bar further to the left, thereby following up the chucks where they dig into the work during the machining operation.

In other words, when the shaft driven by the electrical motor engages the sleeve or nut 19, pressure is built up against the ball thrust 20 and the shoulder on the nut 22. Consequently, when the nut 19 has tightened, there is a fixed pressure between the draw rod and the nut or sleeve 19 and the thrust bearing so that, as before stated, when the chuck is closed by the draw rod, the spring 44 is compressed and when the jaws have a tendency to grip the piece more tightly or dig deeper into the forgings or castings, this spring will expand and follow up the pressure and hold the piece firmly until the machining operation is completed.

When it is necessary to release the chucks from the work, the shaft 30 is again shifted into position for the lugs 40 to engage the lugs 41 of the nut 19 and it is turned in the opposite direction, thus releasing the pressure on the spring and causing the member 19 to shift to the left and the draw rod to shift to the right. As the draw rod moves in either direction, the levers 47 pivoted at 48 move the chuck jaws in or out to chuck or unchuck the work.

Thus, in the operation of this mechanism, when the nut or sleeve 19 is rotated by the shaft 30, it shifts the draw bar 17 to the rear, thereby closing the chuck jaws on to the work and, of course, tightening them thereon.

During this movement of the draw bar, the sleeve, of course, is shifted slightly in the opposite direction or toward the front end of the spindle, the movement of the sleeve being sufficient to compress the high spots in the spring so that when the shaft 30 is withdrawn from the sleeve, the expansion of this spring will cause the sleeve to hold the draw bar in the desired position and maintain the chuck jaws tight on the work.

This spring thus acts as a follow-up means and a cushioning means for the parts so that when the draw bar has been shifted by the shaft 30 as far as possible to tighten the chucks, the expansion of the spring continues to exert a tension on this draw bar and hold it in position and take up any movement of the serrated jaws of the chucks in the event they dig in deeper or if, for any reason, there is any tendency of the work to become loose from the jaws.

It will be understood, of course, that the springs 44 are designed for different pressures to take care of various classes of work and different wall thicknesses of work. For instance, if it takes 5,000 pounds pressure to hold the piece in the chuck, the electric means is regulated for that pressure in the manner set forth in the earlier application hereinbefore referred to so that when the jaws grip the work, this pressure will compress the spring in the manner hereinbefore described thereby enabling the spring to follow-up this pressure on the work.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A chucking mechanism comprising a draw bar operated chuck and rotatable operating means therefor, and means for urging the entire draw bar in its chuck locking direction after the rotatable operating means has performed its work of closing the chuck.

2. A chucking mechanism comprising a draw bar operated chuck and operating means therefor, and resilient means for pushing the draw bar in its chuck locking direction after the operating means has performed its work of closing the chuck.

3. A chucking mechanism comprising a draw bar operated chuck and operating means therefor, and means comprising an annular spring for urging the entire draw bar in its chuck locking direction after the operating means has performed its work of closing the chuck.

4. A chucking mechanism comprising a draw bar operated chuck and rotatable operating means therefor, and means comprising a compressible annular spring having high and low spots and operative on its expansion for urging the draw bar in its chuck locking direction upon the release of its rotatable operating means.

5. A chucking mechanism for multiple spindle machines comprising a chuck, a draw bar shiftable in opposite directions for operating the chuck, a rotatable threaded sleeve for shifting the draw bar, means for rotating said sleeve, means for limiting the endwise movement of said sleeve, and means co-operating with the sleeve and endwise limiting means for urging the sleeve and draw bar in its chuck locking direction upon release of the rotating sleeve.

6. A chucking mechanism comprising a draw bar operated chuck and internally threaded rotatable means for sliding the draw bar, means for limiting the endwise movement of said rotatable means, and spring means for urging the draw bar into its chuck locking position after the cessation of rotation of said rotating means.

7. A chucking mechanism comprising a draw bar operated chuck and internally threaded means for sliding the draw bar upon its rotation and having a shoulder, shouldered nuts for limiting endwise movement of said threaded means, and a spring cushion between a pair of said shoulders for urging the draw bar in its chuck locking direction upon the cessation of rotation of said internally threaded means.

8. A chucking mechanism comprising a draw bar operated chuck and rotatable internally threaded means for sliding the draw bar upon its rotation, a thrust bearing for said threaded means, means for limiting endwise movement of said threaded means, and means cooperating with said thrust bearing and limiting means for urging the draw bar in its chuck locking direction upon the cessation of rotation of said internally threaded means.

9. A chucking mechanism comprising a draw bar operated chuck, electrically operated means therefor and means for pushing the draw bar in its chuck locking direction after the operating means has performed its work of closing the chuck.

10. A chucking mechanism comprising a draw bar operated chuck and electrically operated means therefor including a bearing supported rotatable means, and means co-operating with said bearing for urging the draw bar in its chuck locking direction after the operating means has performed its work of closing the chuck.

11. A chucking mechanism comprising a draw bar operated chuck and operating means therefor including a bearing supported means, and means co-operating with said bearing for urging the draw bar in its chuck locking direction after the operating means has performed its work of closing the chuck.

12. A chucking mechanism comprising a draw bar operated chuck and operating means therefor, and mechanical means for pushing the entire draw bar in its chuck locking direction after the operating means has performed its work of closing the chuck.

13. In a chucking machine having a spindle carrier provided with a rotary chuck carrying spindle, a unit within each spindle for operating its chuck and comprising a shiftable draw rod, an electrically operated threaded driving sleeve for shifting said rod, a thrust bearing co-operating with said sleeve, and a draw rod follow-up cushioning means for said bearing effective to control equal pressure on the work at certain times.

14. In an electric chucking mechanism having a motor driven shaft, a rotary chuck carrying spindle, a draw rod therein for controlling the chuck, a driving sleeve operated by the motor driven shaft and provided with an internal thread controlling the back and forth movement of the draw rod, a thrust bearing for the sleeve, and a draw rod follow-up means co-operating with said thrust bearing.

15. In an electric chucking mechanism having a motor driven shaft, a rotary chuck carrying spindle, a draw rod therein for controlling the chuck, a driving sleeve operated by the motor driven shaft and provided with an internal thread controlling the back and forth movement of the draw rod, a thrust bearing for the sleeve, and a draw rod follow-up means co-operating with said thrust bearing and comprising a spring.

16. In an electric chucking mechanism having a motor driven shaft, a rotary chuck carrying spindle, a draw rod therein for controlling the chuck, a driving sleeve operated by the motor driven shaft and provided with an internal thread controlling the back and forth movement of the draw rod, a thrust bearing for the sleeve, and a draw rod follow-up means co-operating with said thrust bearing and comprising a spring located between the thrust bearing and the spindle.

17. In a chucking machine having a spindle carrier provided with a rotary chuck carrying spindle, a unit within each spindle for operating its chuck and comprising a shiftable draw rod, an electrically operated threaded driving sleeve for shifting said rod, a thrust bearing co-operating with said sleeve, and a draw rod follow-up cushioning means for said bearing effective to control equal pressure on the work at certain times and located between the thrust bearing and the spindle.

18. A chucking mechanism for multiple spindle machines comprising a chuck, a threaded draw bar shiftable in opposite directions for operating the chuck, an electrically operated shouldered and threaded rotatable sleeve for shifting the draw bar, means for limiting endwise movement of said sleeve and comprising a pair of shouldered nuts, a thrust bearing for said sleeve, and spring means between said bearing and a shoulder of one of said parts for urging the sleeve and its draw bar in its chuck locking direction upon the release thereof from the electrical operating means.

19. A chucking mechanism for multiple spindle machines comprising a chuck, a threaded draw bar shiftable in opposite directions for operating the chuck, an electrically operated shouldered and threaded rotatable sleeve for shifting the draw bar, means for limiting endwise movement of said sleeve and comprising a pair of shouldered nuts, a thrust bearing for said sleeve and located between a shoulder of said sleeve and the shoulder of one of said nuts, and spring means between said bearing and said nut for urging the sleeve and its draw bar in its chuck locking direction upon the release thereof from the electrical operating means.

20. A chucking mechanism comprising a draw bar operated chuck and rotatable operating means therefor, and means located laterally of the periphery of said rotatable operating means for pushing the draw bar in its chuck locking direction after the rotatable operating means has performed its work of closing the chuck.

21. A chucking mechanism comprising a draw bar operated chuck and rotatable operating means therefor, and means co-operating with said rotatable means for urging the draw bar in its chuck locking direction upon the cessation of rotation of said rotatable operating means.

22. A chucking mechanism comprising a draw bar operated chuck and operating means for operating said draw bar, and means co-operating with said draw bar operating means for urging the draw bar in its chuck locking direction upon the release of its operating means.

23. A chucking mechanism comprising a draw bar operated chuck and operating means therefor, and compressible means operative on its expansion for urging the draw bar in its chuck locking direction after the chuck operating means has performed its work of closing the chuck.

24. A chucking mechanism comprising a draw bar operated chuck and rotatable operating means therefor, and compressible means operative on its expansion for urging the draw bar in its chuck locking direction after the chuck operating means has performed its work of closing the chuck.

25. A chucking mechanism comprising a draw bar operated chuck and operating means therefor, the same operating means effective to shift the draw bar in opposite directions, and means supported independently of the draw bar for urging the draw bar in its chuck locking direction upon the release of its chuck operating means.

26. A chucking mechanism comprising a draw bar operated chuck and rotatable operating means therefor, and means supported independently of the draw bar for urging the draw bar in its chuck locking direction upon the release of its chuck operating means.

27. A chucking mechanism comprising a draw bar operated chuck, said draw bar having a threaded portion and a portion in front thereof operatively connected with the jaws of the chuck, rotatable operating means therefor, and means cooperating with the threaded portion of the draw bar for pushing said draw bar into its chuck locking direction upon the cessation of rotation of said rotatable operating means.

28. A chucking mechanism for multiple spindle machines comprising a chuck, a draw bar shiftable in opposite directions for operating the chuck, a rotatable threaded sleeve for shifting the draw bar, means for rotating said sleeve, and means cooperating with the sleeve for urging the sleeve and draw bar in its chuck locking direction upon the cessation of rotation of said rotating sleeve.

ALFRED E. DRISSNER.